F. STUCKER, Jr.
Lubricating Car-Axles.
No. 156,185.  Patented Oct. 20, 1874.
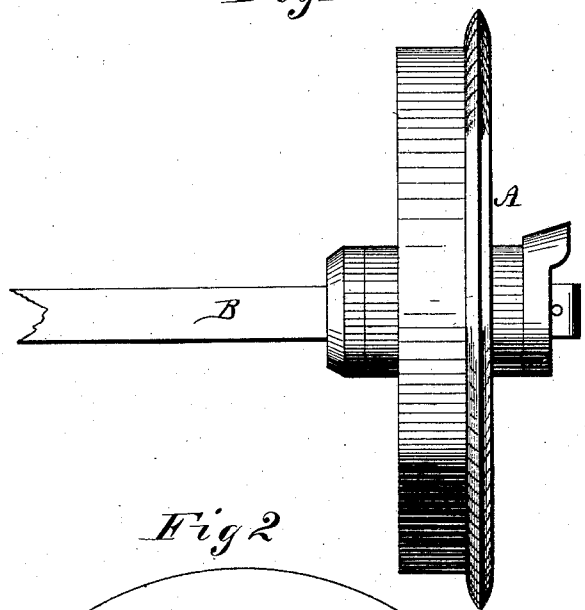
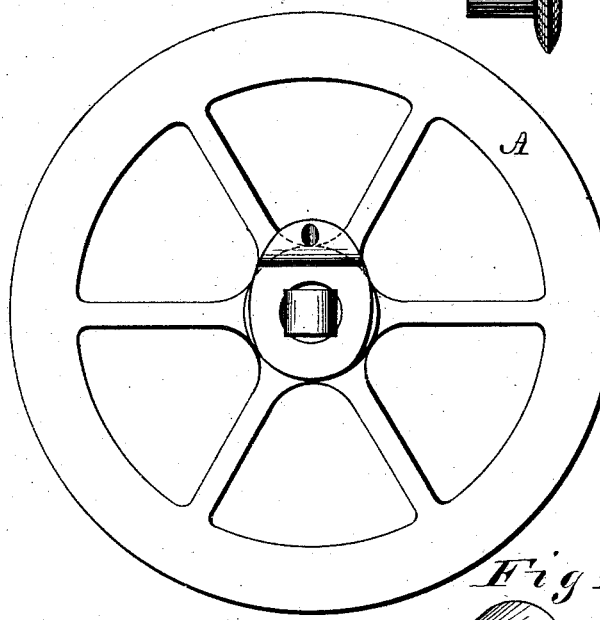
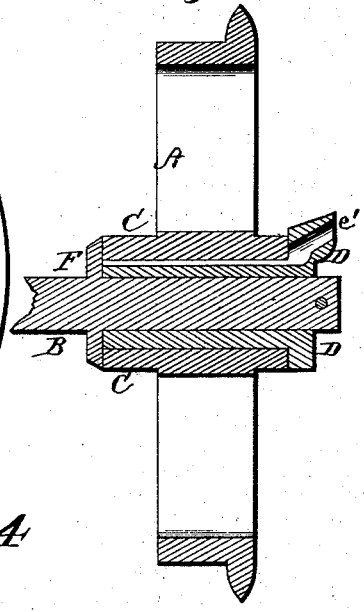
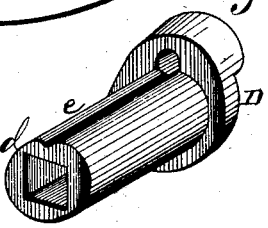
WITNESSES
INVENTOR
Frank Stucker Jr.
per
Alexander Mason
Attorneys

UNITED STATES PATENT OFFICE.

FRANK STUCKER, JR., OF MASSILLON, OHIO, ASSIGNOR TO HIMSELF, JACOB G. BUCHER, AND FRANK H. KILLINGER, OF SAME PLACE.

IMPROVEMENT IN LUBRICATING CAR-AXLES.

Specification forming part of Letters Patent No. 156,185, dated October 20, 1874; application filed September 5, 1874.

*To all whom it may concern:*

Be it known that I, FRANK STUCKER, Jr., of Massillon, in the county of Stark and in the State of Ohio, have invented certain new and useful Improvements in Car-Wheel and Axle; and do hereby declare that the following is a full, clear, and exact description thereof, reference being had to the accompanying drawings, and to the letters of reference marked thereon, making a part of this specification.

The nature of my invention consists in the construction and arrangement of the several parts of a car-wheel, the peculiarities of which will be hereinafter described.

In the accompanying drawings making part of this specification, Figure 1 represents a side view of wheel and axle; Fig. 2 an end view, Fig. 3 a vertical section, and Fig. 4 a perspective, of the sleeve for axle.

In the figures, A represents a car-wheel of ordinary construction; and B the axle, which is formed with a collar, F, and from said collar to its end is made square. D represents a sleeve, which is provided with a square opening to receive the square axle, said axle being made to fit snugly in it. The sleeve D is made to fit snugly in the eye of the wheel, but so that the wheel will revolve readily. In the upper side of the sleeve in its periphery, and longitudinally of it, is formed a groove, $e$, which connects with an oil-hole or chamber, $e'$, in the outer end of the said sleeve. The axle is confined in the sleeve by means of a pin or other suitable device at its end. The sleeve is provided with a collar or flange at its outer end to keep it from entering beyond a certain point into the wheel. By this arrangement and construction the axle is stationary, and the wheel revolves around the sleeve. The sleeve being stationary, and the oil-groove being always upward, the wheel may be oiled at any time it may be necessary.

My invention is applicable to a round as well as a square axle.. In using it with a round axle the opening in the sleeve must also be round, and the two parts suitably keyed or otherwise fastened together.

This wheel is intended to be used on coal-cars, but may be used for any vehicle-wheel, if desirable.

I am aware that it is not new to provide a carriage-axle with an oil-orifice at the inner end of the spindle, and a groove on top of the spindle.

Having thus fully described my invention, what I claim as new, and desire to secure by Letters Patent, is—

The sleeve D, with its oil-groove, in combination with the axle and the wheel A, substantially as and for the purpose set forth.

In testimony that I claim the foregoing I have hereunto set my hand and seal this 18th day of August, 1874.

FRANK STUCKER, JR. [L. S.]

Witnesses:
ISAAC ULMAN,
LEANDER C. COLE.